United States Patent
Clay et al.

(10) Patent No.: US 6,584,982 B1
(45) Date of Patent: Jul. 1, 2003

(54) CIGARETTE BUTT MARKING FOR SMOKING MACHINES

(75) Inventors: Gerald Clay, Danville, VA (US); Grayland Sizemore, Boonville, NC (US)

(73) Assignee: Lorillard Licensing Company, LLC, Greensboro, NC (US)

( * ) Notice: Subject to any disclaimer, the term of this patent is extended or adjusted under 35 U.S.C. 154(b) by 0 days.

(21) Appl. No.: 10/081,495

(22) Filed: Feb. 22, 2002

(51) Int. Cl.$^7$ .......................... A24D 1/00; B23K 26/08; B23K 26/18
(52) U.S. Cl. ................. 131/368; 219/121.68; 219/121.8
(58) Field of Search .................... 131/73, 368, 905; 73/23.2, 28.01, 104, 105; 219/121.6, 121.61, 121.68, 121.79, 121.8

(56) References Cited

U.S. PATENT DOCUMENTS

| | | | |
|---|---|---|---|
| 3,586,007 A | 6/1971 | Kelley et al. ............... | 131/171 |
| 3,732,874 A | 5/1973 | Wagner et al. .......... | 131/171 R |
| 4,019,366 A | 4/1977 | Claflin et al. .................. | 73/23 |
| 4,140,003 A | 2/1979 | Pillsbury, Jr. et al. ......... | 73/23 |
| 4,583,558 A | 4/1986 | Luke .......................... | 131/284 |
| 4,740,269 A * | 4/1988 | Berger et al. ................. | 216/65 |
| 4,858,628 A | 8/1989 | Norman et al. ............. | 181/329 |
| 4,874,919 A * | 10/1989 | Bransden et al. ...... | 219/121.68 |
| 5,117,845 A | 6/1992 | Poulet et al. ............... | 131/330 |
| 5,377,697 A * | 1/1995 | Deutsch et al. ............. | 131/330 |
| 6,130,402 A * | 10/2000 | Abella et al. .......... | 219/121.68 |
| 6,161,551 A | 12/2000 | Sakuma et al. ............. | 131/330 |
| 6,172,328 B1 * | 1/2001 | Jones et al. ............ | 219/121.68 |
| 6,180,914 B1 | 1/2001 | Jones et al. ............ | 219/121.68 |

FOREIGN PATENT DOCUMENTS

| | | |
|---|---|---|
| GB | 2001433 A | of 1979 |
| JP | 6050963 | of 1994 |
| JP | 6050964 | of 1994 |
| JP | 10132803 | of 1998 |
| JP | 10132804 | 5/1998 |

OTHER PUBLICATIONS

Universal Laser System, Inc.; M–300 Laser Platform brochure, copyright 2000.

Fitrona Instruments & Automation, "ASM500 Series Operating Instructions" Prov. Issue 2, Feb. 2000.

Cerulean, "ASM500 Series Operating Instructions" Issue 1, Apr. 2000.

* cited by examiner

Primary Examiner—Steven P. Griffin
Assistant Examiner—Carlos Lopez
(74) Attorney, Agent, or Firm—MacCord Mason PLLC

(57) ABSTRACT

An apparatus for marking cigarettes with a mark to terminate operation of a smoking machine includes a jig for holding at least 40 cigarettes and maintaining the cigarettes' position with a seam side of each cigarette facing a given direction. A scannable laser having a laser light output at an intensity and frequency makes a scorch mark on the seam of each cigarette paper without perforating the cigarette paper. A software control system for the scannable laser is programmed to cause the laser to scan over the cigarettes in the jig to etch and make a circumferentially-oriented line segment mark no longer than 1.5 millimeter and no wider than 0.5 millimeter on the cigarettes at a predetermined position along the length of the cigarettes.

7 Claims, 2 Drawing Sheets

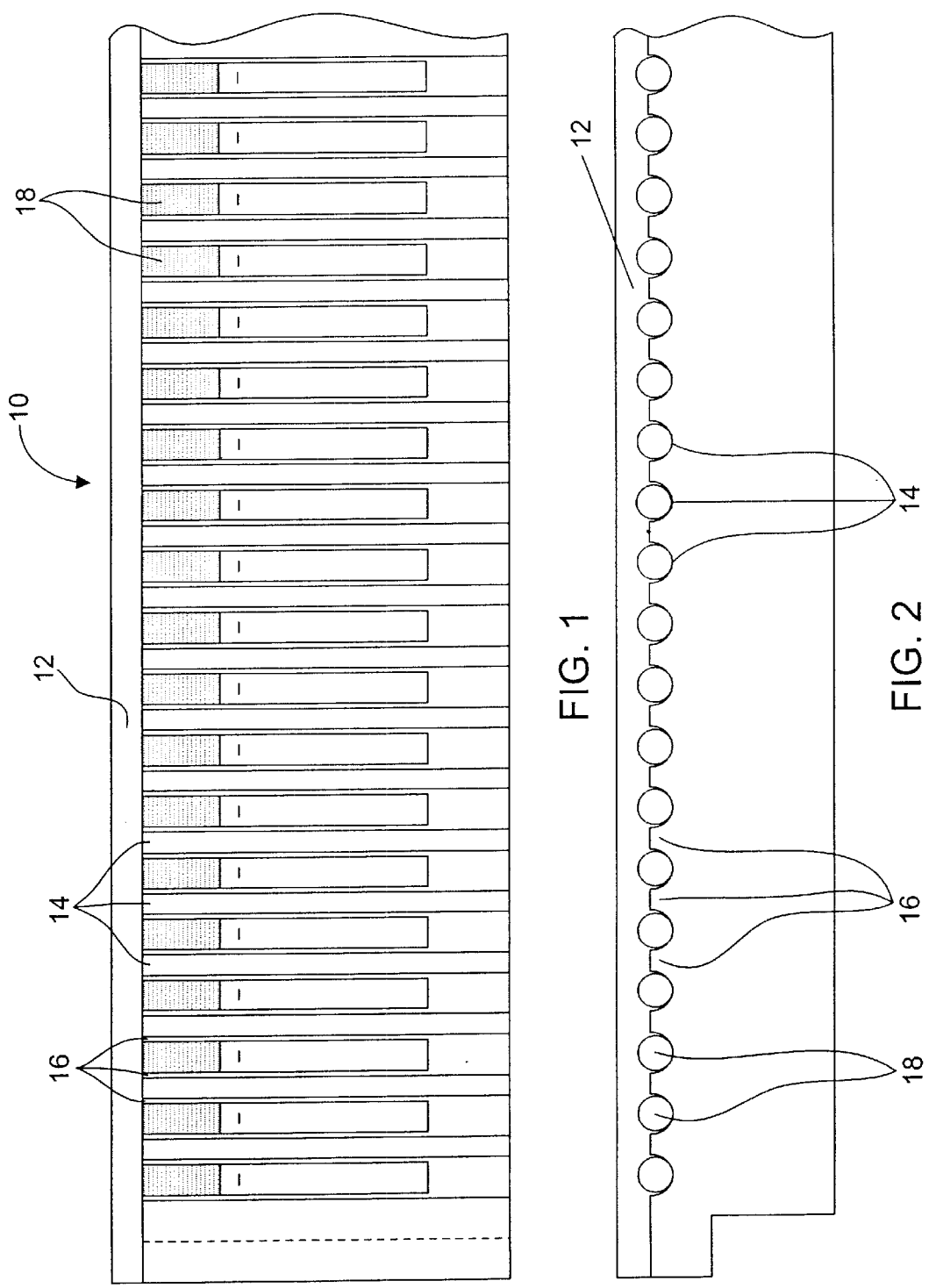

CIGARETTE BUTT MARKING FOR SMOKING MACHINES

BACKGROUND OF THE INVENTION

The present invention relates to improvements in the marking of cigarettes to be smoked by a smoking machine.

Cigarettes are tested in accordance with regulations set forth by various jurisdictions, including the United States Federal Trade Commission and the Commonwealth of Massachusetts. Testing is carried out by machine so that the data can be collected as systematically as possible. Such cigarette smoking machines have been around for a number of years and need no extensive description here. However, it is noted that the present invention is particularly well suited for use with the ASM 516 smoking machine produced by Filtrona Instruments and Automation, now know as Cerulean, located at Rockingham Drive, Linford Wood East, Milton Keynes, MK14 6LY United Kingdom. Other smoking machines that smoke pre-marked cigarettes may be suitable, as well.

In connection with the ASM 516 smoking machine, a mark is made at a point on the cigarette near the puffed end to indicate where a cigarette would likely be considered to be fully smoked and thus extinguished. For example, Cerulean suggests that the mark be 11 millimeters from the end of a filter in a filtered cigarette. The mark is prescribed by Cerulean as being 1.5 millimeters by 0.5 millimeters and located on the seam or over-lap of the wrapping paper. Other sizes and locations may be dictated by various regulatory requirements or testing paradigms.

Once the cigarettes are marked, they are loaded into smoking machine, which has positions for multiple cigarettes, typically 16 cigarettes. The cigarettes are loaded into orifices which will draw on the end of the cigarette, opposite the lit end, to draw smoke through a filter paper and into sampling containers for analysis. In order to simulate smoking as done by theoretical, standardized smoking, puffs are taken on the cigarettes at various intervals for various durations and volumes of intake. As the cigarette is being puffed, it burns with a bright coal that advances along the length of the cigarette. The smoking terminates when the coal reaches the marked portion of the cigarette.

The ASM 516 effects this termination by automatic apparatus. The ASM 516 has an infrared light source that illuminates the seam of the cigarettes and an infrared camera that inspects the cigarette for a mark in a prescribed area. Once a mark is found, the Burn Termination Unit (BTU) computer stores the necessary data to reference the mark during the smoking sequence. More particularly, the camera examines an area of about three millimeters around the expected butt-mark region, looking for the butt-mark.

When smoking under United States Federal Trade Commission guidelines, it is necessary to smoke at least 40 cigarettes for each filtered cigarette sample (smoked with and without filter plugs). When smoking under Commonwealth of Massachusetts guidelines, it is necessary to smoke at least 60 filtered cigarettes. During a year, over 100,000 cigarettes may need to be marked for testing by a cigarette manufacturer. To date, cigarettes have been marked by hand for use in smoking machines. Experience has shown that the hand marking can lead to numerous problems.

Marking cigarettes by hand has been a very tedious, time consuming, laborious and error-prone process. Each cigarette has been placed on a millimeter ruler, and a proper length marked with a fine tip ball-point pen, one cigarette at time. The person doing the marking must have good motor skills and extreme patience. It takes about four man hours to mark about one hundred cigarettes. Out of that one hundred, approximately seventy-five cigarettes are marked properly enough to be useable with an ASM 516 smoking machine.

Problems arise from hand marking that make the mark of cigarettes unsuitable. Each cigarette must be moved, positioned, and hand marked by pressing the pen to the paper. This handling bends and distorts the cigarette somewhat, and possibly causing changes in the smoking characteristics. Personnel eyestrain and hand fatigue are major factors that contribute to mistakes and bad marks, leading to wasted cigarettes.

If the mark is too large, too small, misshapen or too light, the machine will make several attempts to find the mark, but ultimately reject a cigarette that has a mark that is out of tolerance. The ASM 516 machine scans each cigarette, looking for a good mark, and if it is found, the machine stores the mark's location, as measured by its camera, in a memory location. If a defective mark is found, the machine does not terminate the inspection operation but continues inspecting each cigarette until all 16 cigarettes are inspected. If a cigarette is found to have a defective mark the operator is cued from the computer screen which cigarette is defective after all 16 cigarettes have been inspected. It is very important to note that, when there is more than one cigarette that has a defective mark, only the first cigarette in the sequence with a defective mark is displayed on the computer screen. The operator must make the necessary adjustments or replace the defectively marked cigarette before restarting the inspection sequence. The inspection sequence must be restarted from the beginning and re-inspect all 16 cigarettes before the next defectively marked cigarette is identified and displayed on the computer screen. The inspection sequence must be restarted again and again re-inspecting all 16 cigarettes until all cigarettes pass inspection. Thus, the operator must stay by the machine while the cigarettes are being checked to replace improperly marked cigarettes with more properly marked cigarettes that pass the requirements of the ASM 516 machine. Meanwhile, the actual smoking of cigarettes by the machine is delayed, adding to inefficiencies. Thus, the presence of improper marks adds to the cost of the smoking testing program.

In addition, the location of the mark where cigarette smoking is to terminate is particularly critical for the collection of data. The concentrations of tar, nicotine and carbon monoxide in the final smoking puffs are typically higher than the first smoking puff, so that premature or delayed termination can affect the size or number of the last puffs, having an exaggerated effect on the measurements of tar, nicotine and carbon monoxide. Erroneously marked cigarettes that are accepted by the ASM 516 machine would thus cause errors in the data.

Accordingly, there is a need in the art for an improved means and method of marking cigarettes and smoking marked cigarettes.

SUMMARY OF THE INVENTION

The present invention fulfills one or more of these needs by providing an apparatus for marking cigarettes with a mark to terminate operation of a smoking machine including a jig for holding a plurality of cigarettes in position with a seam side of each of the cigarettes facing upward, a scannable laser having a laser light output at an intensity and frequency to make a scorch mark on cigarette paper without perforating the cigarette paper, and a control system for the scannable laser to cause the laser to scan over the cigarettes in the jig to make a circumferentially-oriented line segment mark on the seam of each of the plurality of cigarettes at a predetermined position along the length of the cigarettes.

In one embodiment the jig holds at least 40 cigarettes. The jig may have a backstop to allow the abutting of the cigarettes at a common position.

The circumferentially-oriented line segment mark is preferably no longer than 1.5 millimeter and no wider than 0.5 millimeter. Typically, the scannable laser etches the cigarette paper.

The control system typically includes software that determines a pattern for the scanning.

The invention may also provide a cigarette adapted for smoking in a smoking machine and having a length including a column of tobacco, and a paper wrapper around the column of tobacco the paper wrapper having a scorched circumferentially-oriented line segment at a specific position along the length of the cigarette. If the cigarette has a filter on one end, the specific position is preferably 11 millimeters from the filter.

The invention also can provide a collection of cigarettes adapted for smoking in a smoking machine and each having an identical length, each cigarette including a column of tobacco, and a paper wrapper around the column of tobacco. The paper wrapper of each cigarette in the collection has a scorched circumferentially-oriented line segment at a specific position along the length of the cigarette. The scorched line segment of each cigarette in the collection is of a size and position on the cigarette that is the same size and position as each other cigarette in the collection. Preferably, the collection has at least 40 cigarettes. The method typically includes the preliminary step of placing the cigarettes in a jig to maintain the cigarettes in position with a seam side of each of the cigarettes facing toward a laser light source. The circumferentially-oriented line segment mark on each cigarette in the collection is desirably no longer than 1.5 millimeter and no wider than 0.5 millimeter. In a typical embodiment, the line segment on each cigarette is etched as well as scorched.

The invention may also provide a method of testing cigarettes including marking the seams of cigarettes made of tobacco products surrounded by cigarette papers with a mark at predetermined positions along the lengths of the cigarettes by scanning laser light at an intensity and frequency to make scorch marks on the cigarette papers without perforating the cigarette papers. The marked cigarettes are then loaded in a smoking machine that determines the location of the scorch mark. The method includes igniting the marked cigarettes in the smoking machine, and puffing on the ignited cigarettes to cause them to burn down in length. When a burning coal of a cigarette reaches the scorch mark on the cigarette, puffing on that cigarette is terminated.

The marking may include executing a software program to cause the laser light to scan a predetermined path to make the scorch marks. Marking preferably places a scorch mark that is a circumferentially-oriented line segment mark no longer than 1.5 millimeter and no wider than 0.5 millimeters. The method may include storing in a memory associated with the smoking machine the location of the scorch mark and determining that a burning coal has reached the scorch mark by viewing the ignited cigarette with an infrared camera. The storage process may include illuminating the scorch mark with infrared radiation, viewing the illuminated cigarette with an infrared camera, and recording a location on the cigarette that reflects a reduced amount of infrared radiation to the camera.

BRIEF DESCRIPTION OF THE DRAWINGS

The invention will be better understood by a reading of the Detailed Description of the Examples of the Invention along with a review of the drawings, in which:

FIG. 1 is a top view of a fixture or jig holding cigarettes as they are marked partially broken;

FIG. 2 is a side view of the jig of FIG. 1; and

DETAILED DESCRIPTION OF EXAMPLES OF THE INVENTION

Figure 3:
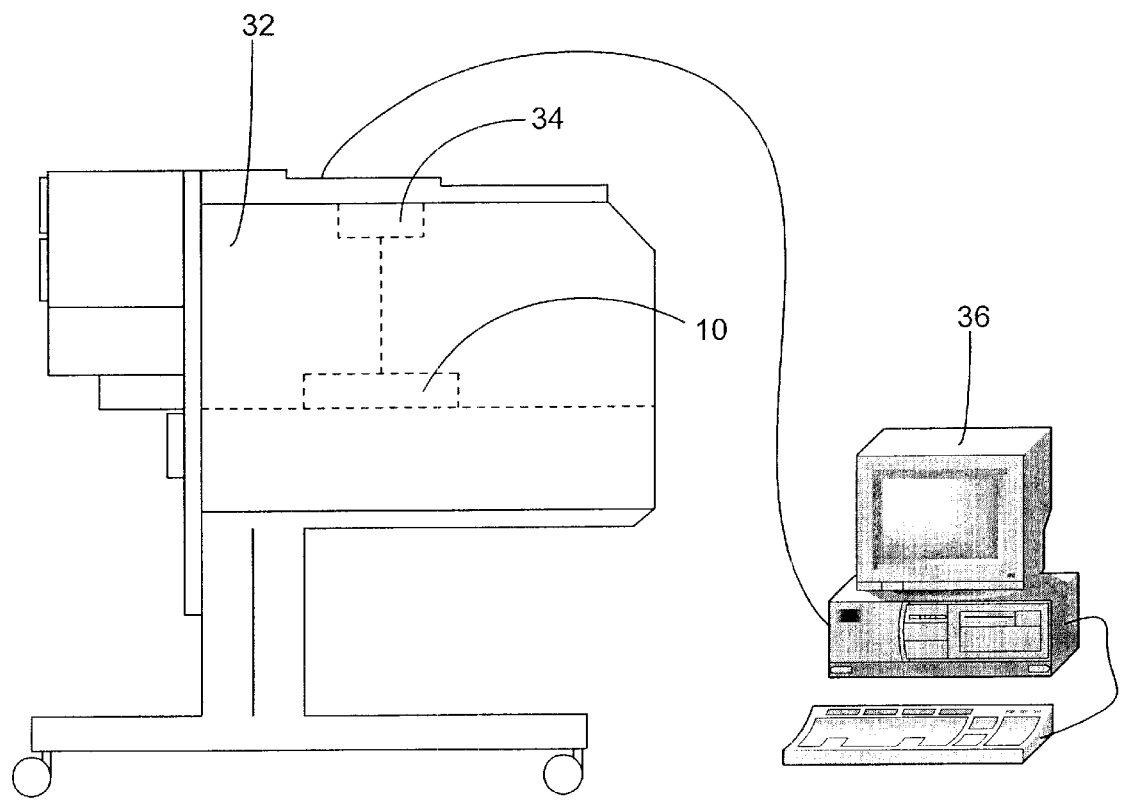
FIG. 3 is a side schematic view of a laser scanning device showing the jig of cigarettes being marked by the laser.

As seen in FIG. 1 a jig or fixture 10 is provided with a plurality of parallel grooves 14 separated by ridges 16. A backstop 12 perpendicular to the grooves forms an edge along one side of the fixture 10 against which the ends of cigarette 18 may abut. By locating cigarettes 18 in the jig against the backstop 12, the length of the cigarette from the backstop is common for all of the cigarettes 18. Thus, a straight line that is parallel with the backstop can be made and have it cross each cigarette at the same position along the length of the cigarette. A full size version of the jig seen in FIG. 1 holds forty cigarettes, although varying sizes, of course, may be adopted.

Figure 4:
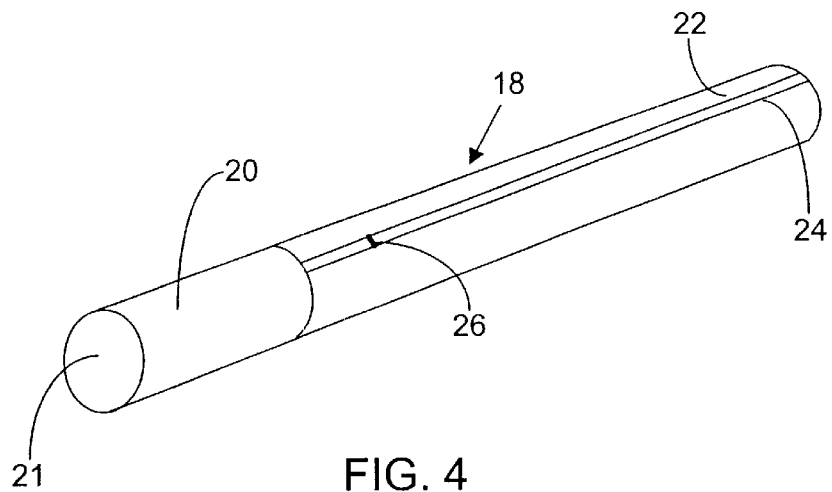
FIG. 4 is a perspective view of a marked cigarette.

As seen in FIG. 4, a cigarette 18 may be provided with a filter 21 and a wrapping paper 22 wrapped about the tobacco column, in a conventional overlapping fashion. Overlap 24 extends the length of the cigarette. The filter 21 is joined to the main body of the cigarette with tipping paper 20.

The mark 26 can be placed on the cigarette 18 while it is positioned in the jig 10 using the apparatus of FIG. 3. As seen in FIG. 3, a laser platform 32 includes a safety cavity in which the jig 10 can be located so that it can be scanned by a laser 34. The laser platform 32 in the preferred embodiment is an M-300 laser platform available from Universal Laser Systems, Inc. of Scottsdale, Ariz. That equipment etches marks on the cigarettes in the jig 10. The laser platform 32 is linked to a computer 36 which is programmed to control the scanning of the laser 34 to make an intermittent line across the jig 10 and thereby make a mark 26 on each of the cigarettes 18 in the jig. The program is set forth to make a mark across the width of the cigarette or circumference as a line segment that is 1.5 millimeters long by 0.5 millimeters wide. The computer 36 may be programmed with a software program such as Corel Draw to create the mark sized and spaced corresponding to the desired placement of the cigarettes in the jig and the placement of the jig 10 in the cavity. The laser platform is controlled by the computer 36 to emit a laser beam that etches the marks on the seams of the cigarettes making a scorch mark which does not perforate but does discolor the generally white paper 22 of the cigarette 18. The laser platform 32 is like a x-y plotter, so that once a software file is created to match a certain cigarette size, mark and coordinates, the file may be stored in the computer 36 and re-used as needed.

Once the cigarettes have been marked, which takes typically thirty seconds to mark 100 cigarettes, they may be placed in the ASM 516 smoking machine, so that they may be inspected by the BTU camera system of the smoking machine.

The ASM 516 smoking machine has a burn termination unit ("BTU") that has an operational mode that scans the cigarette to look for a mark on each of the 16 cigarettes in the smoking machine, and stores the mark's location in memory. The camera watches the cigarette while it is smoked and terminates smoking when the location of the burning coal of the cigarette matches the stored location of the mark.

The cigarettes marked in accordance with the invention and loaded in to ASM 516 smoking machine have been properly seen by the BTU unit with a 99% success rate. This virtually eliminates the butt-mark detection errors, reducing the accumulating restart time to minutes, as opposed to hours.

The invention provides a method of testing cigarettes which includes marking the seams of the cigarette with a mark at pre-determined positions along the lengths of the cigarettes by scanning a laser light at an intensity frequency to make the scorch marks on the cigarette papers without perforating the cigarette paper. The marked cigarettes are loaded into a smoking machine which determines the location of the scorch mark. Then the cigarettes are ignited in the smoking machine and puffed on to cause them to burn down in length. When the burning coal of the cigarette reaches the scorch mark on the cigarette, the puffing is terminated.

Properly positioning 100 cigarettes in the jig 10 may take fifteen or twenty minutes, much less time than is required for hand marking. As can appreciated, the cigarettes marked in the jig 10 will all be identically marked. Therefore they will amount to a collection of cigarettes that are suitable for smoking in the smoking machine each having an identical length and each having a column of tobacco having a paper wrapper around the column of tobacco. The paper wrapper of each cigarette in the collection will have a scorched, circumferencely-oriented line segment at a specific position along the length of the cigarette. The scorched line segment of each cigarette in the collection will be of a size and position of the cigarette that is the same size and position as each other cigarette in the collection. Accordingly, the errors of misreading ones of the cigarettes which were loaded into a smoking machine will be drastically reduced.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for marking on cigarettes made of cigarette paper wrapped around a tobacco column with a paper seam to terminate operation of a smoking machine comprising a jig for holding a plurality of cigarettes in position with the seam side of each of the cigarettes facing upward, a scannable laser having a laser light output at an intensity and frequency to make a scorch mark on cigarette paper without perforating the cigarette paper, and a control system for the scannable laser to cause the laser to scan over the cigarettes in the jig to make a circumferentially-oriented line segment mark on the seam of each of the plurality of cigarettes at a predetermined position along the length of the cigarettes.

2. An apparatus as claimed in claim 1 wherein the jig holds at least 40 cigarettes.

3. An apparatus as claimed in claim 1 wherein the circumferentially-oriented line segment mark is no longer than 1.5 millimeter and no wider than 0.5 millimeter.

4. An apparatus as claimed in claim 1 wherein the scannable laser etches the cigarette paper.

5. An apparatus as claimed in claim 1 wherein the control system includes software that determines a pattern for the scanning.

6. An apparatus as claimed in claim 1 wherein the jig has a backstop to allow the abutting of the cigarettes at a common position.

7. An apparatus for marking on cigarettes made of cigarette paper wrapped around a tobacco column with a paper seam to terminate operation of a smoking machine comprising a jig for holding at least 40 cigarettes and maintaining the cigarettes' position with the seam side of each cigarette facing a given direction, a scannable laser having a laser light output at an intensity and frequency to make a scorch mark on the seam of each cigarette paper without perforating the cigarette paper, and a software control system for the scannable laser programmed to cause the laser to scan over the cigarettes in the jig to etch and make a circumferentially-oriented line segment mark no longer than 1.5 millimeter and no wider than 0.5 millimeter on the seam of each of the plurality of cigarettes at a predetermined position along the length of the cigarettes.

\* \* \* \* \*